June 2, 1970  D. H. BRUNK  3,515,342
NAVIGATION COMPUTER
Filed June 10, 1968
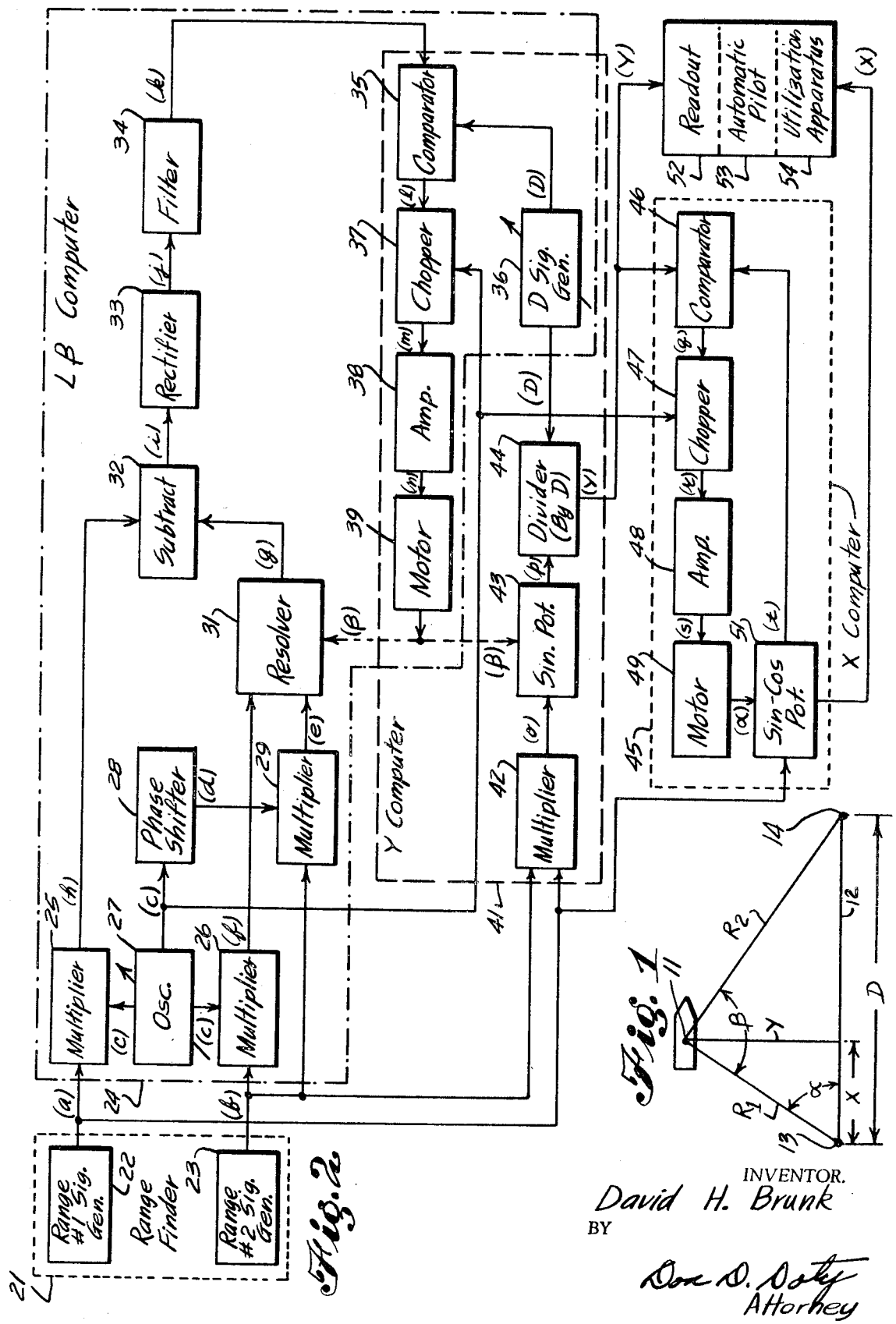
INVENTOR.
David H. Brunk
BY
Don D. Doty
Attorney

United States Patent Office 3,515,342
Patented June 2, 1970

3,515,342
NAVIGATION COMPUTER
David H. Brunk, Panama City, Fla., assignor to the United States of America as represented by the Secretary of the Navy
Filed June 10, 1968, Ser. No. 735,755
Int. Cl. G06g 7/12; G01c 21/20
U.S. Cl. 235—150.27          9 Claims

ABSTRACT OF THE DISCLOSURE

A navigation system for continuously computing and indicating the position of a vehicle with respect to a pair of known reference markers, as it is being steered along a predetermined course within a narrow channel; said system containing a range finder, a triangle coordinates analog computer, and a readout.

---

The invention described herein may be manufactured and used by or for the Government of the United States of America for governmental purposes without the payment of any royalties thereon or therefor.

The present invention relates generally to navigation systems and, in particular, is an analog computer which facilitates the steering of a vehicle along a predetermined course within a narrow channel that substantially parallels a known base line having known reference points or markers intermittently positioned thereon.

Navigating ships through narrow channels is, at best, somewhat hazardous; but doing so during Naval or Military operations can be even more dangerous, if the channel being traversed is vulnerable to enemy attack. Heretofore, much of ship navigation has been achieved by means of various and sundry optical sighting instruments, transponders, sound ranging and radar systems, and the like —some of which require considerable auxiliary apparatus, as well. However, although quite helpful during many navigation situations, for the most part, their success seems to be contingent upon their being used by highly trained, highly skilled, and experienced navigators. Thus, unless the talents of such navigators are combined therewith, they sometimes leave a great deal to be desired. Moreover, to the degree that the human element or expertise is not required to successfully operate such navigation systems, to that extent most of them become complex, burdensome, awkward, unreliable, and expensive. Accordingly, to date, there is considerable room for improvement of such devices, although it is recognized that they are useful for some practical purposes as they are.

The instant invention overcomes many of the disadvantages of the aforementioned presently existing systems and, therefore, constitutes a definite improvement thereover. Hence, it appears to constitute a considerable advancement in the navigation and navigation computer arts, regardless of whether the navigation of any particular type vehicle is occurring in water, on water, in air, or in space.

It is, therefore, an object of this invention to provide an improved navigation system.

Another object of this invention is to provide an improved analog computer for calculating the position of an object or a vehicle relative to a pair of known reference marks.

Still another object of this invention is to provide a more accurate method and means for continuously navigating a ship or other vehicle along a desired course which substantially parallels a known base line having known reference marks intermittently positioned thereon.

A further object of this invention is to provide an improved channel navigation system, whereby a pilot can constantly know his exact position within a given channel.

Another object of this invention is to provide a method and means for resolving pairs of range measurements made between a vehicle and a pair of points of known location and separation distance into coordinate analog signals representing the position of said vehicle relative thereto.

A further object of this invention is to provide an improved computer for solving the geometry of a triangle to determine the angle between two sides thereof when the lengths of all three sides thereof are known.

Another object of this invention is to provide an improved computer for calculating the perpendicular distance from the base of a triangle to the point of intersection of the other two sides thereof when the lengths of all three sides thereof are known.

Another object of this invention is to provide a relatively simple navigation computer that may be easily and economically manufactured, maintained, and operated.

Other objects and many of the attendant advantages will be readily appreciated as the subject invention becomes better understood by reference to the following detailed description, when considered in conjunction with the accompanying drawings wherein:

FIG. 1 is a schematic diagram which depicts the geometry of a typical navigation problem of the type solved by the subject invention; and FIG. 2 is a functional block diagram of an exemplary preferred embodiment of the subject invention.

Referring now to FIG. 1, there is shown a ship 11 which is traveling along a predetermined course which is substantially parallel to a known base line 12 on which are located at least two known reference marks 13 and 14. In this particular instance, reference marks 13 and 14 are separated by a known distance D, and ship 11 is traveling at a distance Y from the base line 12 connected therebetween. Distance Y is, of course, illustrated by the perpendicular dropped from ship 11 to base line 12. In this particular case, the distance between reference mark 13 and the point where perpendicular Y touches base line 12 is designated as distance X. If lines are respectively drawn between ship 11 and reference marks 13 and 14, they are representative of ranges $R_1$ and $R_2$ therebetween. Then it may readily be seen that connecting points or elements 11, 13, and 14 forms a triangle having sides $R_1$, $R_2$, and base line 12. $\alpha$ is herewith designated as the angle between $R_1$ and base line 12, and $\beta$ is herewith defined as the angle between $R_1$ and $R_2$. Thus, the geometry of the problem solved by the subject invention is schematically portrayed; nevertheless, it will be discussed in greater detail subsequently during the explanation of the operation of the invention presented below.

Referring now to FIG. 2, there is shown a preferred embodiment of the system constituting this invention which is ordinarily disposed in the vehicle being navigated—in this case, ship 11 of FIG. 1. As may readily be seen, it contains a range finder 21 which includes a range $R_1$ signal generator 22 and a range $R_2$ signal generator 23. Range $R_1$ signal generator 22 and range $R_2$ signal generator 23 produce a pair of direct current (DC) signals (a) and (b) which are proportional to ranges $R_1$ and $R_2$, respectively, as they are depicted in FIG. 1.

It should be understood that range finder 21 may be any type range finder that will operate properly in the environment within which it is used. It is not to be limited thereto, but it may, for example, be of a radar type, a sound ranging type, or an optical type. The type used will, in all probability, be determined by the type of vehicle being navigated and the medium in which it is traveling. Obviously, it would be well within the purview of one skilled in the art having the benefit of the teachings presented herewith to make the proper design selection thereof for any given operational circumstances.

The DC outputs $a$ and $b$ from range signal generators 22 and 23 are connected to the inputs of an angle β computer 24, which, in this case, are actually one of the inputs of a multiplier circuit 25 and one of the inputs of another multiplier circuit 26, respectively. Multipliers 25 and 26 may, of course, be of any particular type that is compatible with the remainder of the subject system; however, it has been determined that amplitude modulators of the non-linear mixer type are satisfactory for such purpose.

The other inputs of multipliers 25 and 26 are connected to the output of an adjustable frequency oscillator 27 which is designed to produce a sine wave signal $c$ defined mathematically by the term $\sin \omega t$ which, in this particular instance, may be considered as the master clock signal for the entire invention. Although the frequency of the output signal from oscillator 27 may be adjusted to provide optimum performance within the remainder of the invention, it has been found that a frequency of four hundred cycles per second is quite satisfactory.

A ninety degree phase shifter 28 is connected to the output of oscillator 27 for the purpose of converting the aforementioned $\sin \omega t$ signal to a $\cos \omega t$ signal synchronized or correlated therewith. Hence, the output $d$ of phase shifter 28 is a signal that may be defined mathematically by the term $\cos \omega t$.

Thus, it may be seen that four of the five essentially basic signals operative in the subject invention are generated by components 22, 23, 27, and 28. They have been defined according to their respective mathematical functions at this time in order to insure that there will be no question with respect to their particular structures. The fifth essentially basic signal and its generator will be described later on. All of the remaining components are structurally defined by the respective names assigned thereto; therefore, to simplify this disclosure, they, too, will be described functionally and mathematically later on, during the discussion of the operation of the invention.

The output of range $R_2$ signal generator 23 of range finder 21 and the output of phase shifter 28 are connected to the inputs of a multiplier circuit 29 that is similar to the aforesaid multiplier circuits 25 and 26, and the output $e$ thereof is connected to one of the electrical inputs of a resolver 31. The other electrical input of resolver 31 is connected to the output $f$ of a multiplier 26, and the output $g$ of resolver 31 is connected to one of the inputs of a subtract circuit 32. The other input thereto is coupled to the output $h$ of the aforementioned multiplier 25, and the output $i$ of subtract circuit 32 is connected through a series connected rectifier 33 and filter 34, before being coupled to one of the inputs $k$ of a comparator 35. The other input of comparator 35 is connected to the output of a variable direct curernt signal generator 36, which produces a DC voltage thereat that is representative of distance D, as it is portrayed in FIG. 1. The output $l$ of comparator 35 is, in turn, connected to the input of a chopper 37, with the output $m$ thereof connected through an amplifier 38 to the input $n$ of a reversible motor 39. For timing and synchronization purposes, chopper 37 has one of its inputs connected to the output of oscillator 27 in such manner as to be driven thereby. The shaft output of motor 39 is mechanically connected to a compatible input of the aforesaid resolver 31, as is conventional in the art.

As may readily be seen from FIG. 2, uniquely combined elements 25 through 29 and 31 through 39 actually make up null-balanced angle β computer 24; however, further inspection of said figure will disclose that elements 35 through 39 are common to both angle β computer 24 and a Y coordinate computer 41. Hence, the output of the aforementioned filter 34 is, in fact, also connected to one of the inputs of Y computer 41.

The other inputs to Y computer 41 actually occur at the inputs of another multiplier circuit 42, which are, in fact, respectively connected to the outputs of range signal generators 22 and 23 of range finder 21. The output $o$ of multiplier 42 is coupled to the electrical input of a sine potentiometer 43. The other input to sine potentiometer 43, a mechanical input, is connected to the shaft output of the aforementioned motor 39. A divider circuit 44, having a pair of inputs and an output, has one of its inputs $p$ connected to the output of sine potentiometer 43, and the other thereof connected to the output of the aforesaid variable signal generator 36, the output signal of which, as previously mentioned, represents the distance D between reference marks 13 and 14 on base line 12 of the triangle depicted in FIG. 1.

In this particular arrangement the D input from signal generator 36 becomes the divisor and, therefore, divider 44 is, in fact, a divide by D circuit.

The output of divider 44 is, of course, the output of Y computer 41 and, thus, the output signal therefrom represents coordinate distance Y, as it, too, is illustrated in FIG. 1.

The particular unique arrangement of elements 35 through 39 and elements 42 through 44 obviously make up Y computer 41; but, of course, as previously indicated, elements 35 through 39 are common to both angle β computer 24 and Y computer 41.

The Y signal output of divider 44 of Y computer 41 is connected to one of the inputs of an X computer 45, as by means of one of the inputs of a comparator 46 thereof. The output $q$ of comparator 46 is, in turn, connected to another chopper 47 which, like chopper 37 of Y computer 41, is connected to the output $c$ of oscillator 27 for the purpose of being timely and synchronously driven thereby.

The output $r$ of chopper 47 is connected through a suitable amplifier 48 to the input $s$ of a reversible motor 49. The shaft output $\alpha$ of motor 49 is coupled to the compatible mechanical input of a sin-cos potentiometer 51, the other input of which, being an electrical input, is connected to the output $a$ of the aforesaid range $R_1$ signal generator 22 of range finder 21. The output $t$ of sin-cos potentiometer 51 is connected to the other input of comparator 46.

As may be seen, uniquely arranged elements 46 through 49 and 51 constitute X computer 45, with the X coordinate output thereof being located at the output of sin-cos potentiometer 51.

The Y output from divider 44 of Y computer 41 and the X output from sin-cos potentiometer 51 of X computer 45 are both connected to appropriate inputs of at least a readout 52. It should, of course, be understood that readout 52 may be any preferred type, such as, for example, an oscilloscpoe, oscillograph, strip chart recorder, etc.

It should also be understood that the X and Y outputs may optionally be connected to any compatible automatic pilot system 53 or any other desired utilization apparatus 54 that may be advantageously combined with or used in conjunction with the navigation computer portion of this invention, inasmuch as so doing would be obvious to the skilled artisan having the benefit of the teachings presented herewith.

Furthermore, it would appear to be noteworthy that each and every one of the components represented by the blocks of FIG. 2 is well known and conventional per se and, thus, is commercially available. Therefore, it should be understood that it is their unique interconnections and interactions that combine to effect the subject invention and the new and improved results produced thereby.

The operation of the invention will now be discussed briefly in conjunction with both figures of the drawing.

Channel navigation systems incorporating the instant invention use stationary reference markers placed in a straight line at known and preferably regular intervals. The type of reference markers employed, of course, depends on the operational circumstances involved and the range finding equipment used. Hence, they may be located on land adjacent to the course desired to be traveled by a vehicle, or they may be placed in or on water, in the event it is expedient to do so.

Because the preferred embodiment disclosed herewith is for the purpose of navigating a ship within a relatively narrow channel, markers 13 and 14 may be considered as being located on land sufficiently nearby to be accurately acquired by, say, a radar type range finder 21. Thus, as ship 11 travels along its intended course, range measurements $R_1$ and $R_2$ are made to markers 13 and 14 and DC signals are generated by generators 22 and 23 which are proportional thereto, respectively. As a result of this, three dimensions of the triangle of FIG. 1 become known and, hence, the three input signals required for the invention to perform its analog calculations—namely, $R_1$, $R_2$, and D—become available.

The calculations made, in this parictular case, are X and Y because it has been ascertained that determining the ship's position in terms of the distance X between reference marker 13 and perpendicular Y and the length of said perpendicular facilitate the piloting thereof along the desired course in the most expeditious manner possible, regardless of whether manual or automatic steering is being used.

In view of the foregoing, it may be seen that the following trigonometric relationships are important to the solving of this navigation problem. Letting A = the area of the triangle of FIG. 1;
D = the distance between reference markers 13 and 14;
Y = the shortest distance from ship 11 to base line 12 at any given instant;
$\beta$ = the angle between sides $R_1$ and $R_2$; and
$\alpha$ = the angle between $R_1$ and line 12;

it may then be seen that $$A = \frac{DY}{2} \quad (1)$$

and $$A = \frac{R_1 R_2 \sin \beta}{2} \quad (2)$$

Then $$DY = R_1 R_2 \sin \beta \quad (3)$$

and $$Y = \frac{R_1 R_2 \sin \beta}{D} \quad (4)$$

Also $$Y = R_1 \sin \alpha \quad (5)$$

$$X = R_1 \cos \alpha \quad (6)$$

From the solution of Equations 4, 5, and 6 by the invention, distances X and Y become known and can be used to guide ship 11 along its intended course through a narrow channel. The structural device of FIG. 2 performs such calculations constantly and automatically and with considerable accuracy.

As a result of making range measurements $R_1$ and $R_2$, direct current voltage signals proportional thereto are supplied to multipliers 25 and 26, respectively. But in order to process said $R_1$ and $R_2$ signals in terms of phase relationships, oscillator 27 generates and supplies a signal c having characteristics of a sine wave and defined mathematically by the term sin $\omega t$. As a result of multiplication by multipliers 25 and 26, the outputs h and f therefrom become $R_1 \sin \omega t$ and $R_2 \sin \omega t$, respectively.

The sin $\omega t$ signal is then transformed into a cos $\omega t$ signal d by phase shifter 28, after which it is supplied to multiplier 29 for the purpose of being multiplied with $R_1$, likewise supplied thereto. Thus the output e of multiplier 29 becomes $R_2 \cos \omega t$. Both $R_1 \sin \omega t$ and $R_2 \cos \omega t$ are supplied to resolver 31 along with a shaft setting representing some angle $\beta$. At this time, because the null-balance process of the system has not become balanced, the aforesaid angle $\beta$—and, hence, the shaft position of resolver 31—will probably be in error. In any event, the output signal g of resolver 31 will be $R_2 \sin (\omega t + \beta)$, and this signal is supplied to one of the inputs of subtract circuit 32, in order to be subtracted from the signal $R_1 \sin \omega t$ also supplied to subtract 32 by multiplier 25. The output i of subtract circuit 32 is, in actuality, the vector sum of the inputs thereto and thus becomes $$[R_1 \sin \omega t - R_2 \sin (\omega^t + \beta)]$$

After rectifying to change this signal to a direct current signal j proportional thereto and filtering it to obtain the peak voltage k thereof, it is supplied to comparator 35 for algebraic comparison with the known base line voltage of signal D, likewise supplied thereto by preset signal generator 36. The output signal l from comparator 35 is of such magnitude and polarity as to ultimately be useful to correct any difference that may exist between the aforementioned possibly erroneous angle $\beta$ and the true angle $\beta$ for any given triangle parameters. It is then chopped to obtain a signal m having pulsating DC qualities by chopper 37, amplified to a more useful level n by amplifier 38, and then used to drive motor 39 in such direction as to decrease the error of the $\beta$ shaft input to resolver 31. Of course, it may overrun the mark, make corrections in the opposite direction, and thereby hunt toward the correct $\beta$ shaft setting until a null-balance is actually reached on the correct one. Once this null-balance has been achieved, angle $\beta$ and the shaft setting of motor 39 representing it are then correct for any given ranges $R_1$ and $R_2$ and base line 12 distance D.

The properly positioned shaft of motor 39 also properly positions the adjustable arm of sine potentiometer 43.

Multiplier 42 multiplies the $R_1$ and $R_2$ signals supplied thereto by range signal generators 22 and 23 to produce the product signal $R_1 R_2$ at the output o thereof. This product signal is then supplied to sine potentiometer 43 which produces an $R_1 R_2 \sin \beta$ signal at the output p thereof, and this signal is, in turn, divided by signal D generated by signal generator 36—the remaining basic input signal generator—to produce a $$\frac{R_1 R_2 \sin \beta}{D}$$

signal. But, of course, as mentioned previously in Equation 4, this signal is equal to Y and is one of the desired dimension outputs, since it represents the perpendicular distance from the ship being navigated to known base line 12.

The aforementioned $R_1$ signal is also supplied to the electrical input of sin-cos potentiometer 51, along with a signal representing $\alpha$ supplied thereto by the shaft setting of motor 49. At this particular instant, $\alpha$ may be in error, but it, too, may be corrected by means of a null-balance system which makes use of the aforesaid Y signal as the operative signal therefor, in accordance with the aforementioned Equation 5. In order to effect such null-balance operation, error signal $R_1 \sin \alpha$, the output t from sin-cos potentiometer 51, and accurate signal Y from divider 44 are algebraically subtracted in comparator 46. The difference therebetween has a magnitude and polarity which are representative of the direction of needed correction. This signal q is chopped by chopper 47 to make it a pulsating DC signal r which is then amplified to a more useful level s by amplifier 48 before being applied to reversible motor 49 for rotation thereof to effect the null condition. Once such condition exists, the angle $\alpha$ is correctly represented by the output shaft of motor 49 and, thus, by the arm setting of sin-cos potentiometer 51; therefore, the output thereof becomes a true $R_1 \cos \alpha$ signal. Inasmuch as this $R_1 \cos \alpha$ signal is equal to the true X signal—as previously defined in Equation 6—it is indicative of the distance between reference marker 13 and perpendicular Y (as measured along base line 12) and, consequently, is another of the desired dimensions.

As may readily be seen, once X and Y are computed, the position of the ship 11 with respect to the reference markers and base line 12 therebetween is also known. And when these distances are displayed by any appropriate readout 52, ship 11 may be easily piloted with considerable accuracy along any desired course, even, for instance, within a narrow channel of water. Of course, the piloting may be accomplished either manually by a human pilot who observes readout 52 and then makes the proper rudder corrections to steer the ship, or, if preferred, the X and Y outputs may be connected to any compatible overridable automatic pilot system which will continuously steer the ship in the desired direction. Moreover, it should be understood that any other utilization apparatus may also be connected for response to the X and Y outputs as necessary to perform various and sundry functions that would provide advantageous concomitants to system constituting this invention.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A computer comprising in combination:
   a master oscillator means for producing a predetermined sine wave signal at the output thereof;
   a first multiplier having a pair of inputs and an output, with one of the inputs thereof connected to the output of said oscillator, and with the other input thereof responsive to a predetermined direct current signal;
   a second multiplier having a pair of inputs and an output, with one of the inputs thereof connected to the output of said oscillator, and with the other input thereof adapted for response to another predetermined direct current signal;
   a phase shifter connected to the output of said oscillator for converting said sine wave signal into a cosine wave signal;
   a third multiplier having a pair of inputs and an output, with one of the inputs thereof connected to the output of said phase shifter, and with the other input thereof connected to the input of the aforesaid second multiplier;
   a resolver having a trio of inputs and an output, with two of the inputs thereof respectively connected to the outputs of said second and third multipliers;
   a subtract circuit having a pair of inputs and an output, with one of the inputs thereof connected to the output of said resolver, and with the other input thereof connected to the output of the aforesaid first multiplier;
   a rectifier connected to the output of said subtract circuit;
   a filter connected to the output of said rectifier;
   a variable direct current signal generator;
   a first comparator having a pair of inputs and an output, with one of the inputs thereof connected to the output of said filter, and with the other input thereof connected to the ouput of said variable direct current signal generator;
   a first chopper connected to the output of said first comparator;
   a reversible motor having an input and shaft output, with the input thereof effectively connected to the output of said first chopper, and with the shaft output thereof connected to the remaining input of the aforesaid resolver;
   a fourth multiplier having a pair of inputs and an output, with the inputs thereof respectively connected to the inputs of the aforesaid first and second multipliers;
   a sine potentiometer having a pair of inputs and an output, with one of the inputs thereof connected to the output of said fourth multiplier, and the other input thereof connected to the shaft output of the aforesaid first reversible motor;
   a divider having a dividend input, a divisor input, and a quotient output, with the dividend input thereof connected to the output of said sine potentiometer, the divisor input thereof connected to the output of the aforesaid direct current signal generator, and with the quotient output thereof adapted for connection to a predetermined utilization apparatus;
   a sin-cos potentiometer having a pair of inputs and a pair of outputs, with one of the inputs thereof connected to the input of the aforesaid first multiplier, and with one of the outputs thereof adapted for being connected to the aforesaid utilization apparatus;
   a second comparator having a pair of inputs and an output, with one of the inputs thereof connected to the quotient output of said divider, and with the other input thereof connected to the other output of said sin-cos potentiometer;
   a second chopper connected to the output of said comparator; and
   a second reversible motor having an input and a shaft output, with the input thereof effectively connected to the output of said second chopper, and with the shaft output thereof connected to the other input of the aforesaid sin-cos potentiometer.

2. The invention according to claim 1 further characterized by means connected between the output of said oscillator and predetermined inputs of said first and second choppers for the driving thereof in synchronism therewith.

3. The invention according to claim 1 further characterized by a pair of amplifiers connected between the output of said first chopper and the input of said first reversible motor and the output of said second chopper and the input of said second reversible motor, respectively.

4. The invention according to claim 1 further characterized by a readout having a pair of inputs and an output, with one of the inputs connected to the quotient output of the aforesaid divider and the other input thereof connected to the output of said sin-cos potentiometer.

5. The invention according to claim 1 further characterized by an automatic pilot having a pair of inputs and an output, with one of the inputs thereof connected to the quotient output of the aforesaid divider, and the other input thereof connected to the output of said sin-cos potentiometer.

6. The invention according to claim 1 further characterized by a utilization apparatus having a pair of inputs and an output, with one of the inputs thereof connected to the quotient output of the aforesaid divider, and with the other input thereof connected to the output of said sin-cos potentiometer.

7. The invention according to claim 1 further characterized by a range finder for measuring the distance to a predetermined pair of markers and for generating a pair of direct current signals proportional thereto, respectively.

8. The invention according to claim 7 wherein said range finder is a radar system having a pair of range signal generators.

9. The invention according to claim 7 wherein said range finder is a sound ranging system having a pair of range signal generators.

References Cited
UNITED STATES PATENTS
| | | | |
|---|---|---|---|
| 2,943,321 | 6/1960 | Karpeles | 343—112 |
| 3,160,878 | 12/1964 | Galloway | 235—150.26 X |
| 3,248,734 | 4/1966 | Weiss et al. | 343—112 |
| 3,397,400 | 8/1968 | Maass et al. | 343—112 |
| 3,422,418 | 1/1969 | Simoneau | 235—150.2 |

FOREIGN PATENTS
192,287 3/1960 Sweden.

MALCOLM A. MORRISON, Primary Examiner

R. W. WEIG, Assistant Examiner

U.S. Cl. X.R.

235—150.2